US008879682B2

(12) United States Patent
Jang et al.

(10) Patent No.: US 8,879,682 B2
(45) Date of Patent: *Nov. 4, 2014

(54) METHOD AND SYSTEM FOR REDUCED SYSTEM-TIME OVERHEAD PARAMETER LENGTH REPRESENTATION FOR INTER-RADIO ACCESS TECHNOLOGY COMMUNICATION

(75) Inventors: Ke-Chi Jang, Plano, TX (US); Eric W. Parsons, Stittsville (CA); Larry T. Bolen, McKinney, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 250 days.

This patent is subject to a terminal disclaimer.

(21) Appl. No.: 13/615,317

(22) Filed: Sep. 13, 2012

(65) Prior Publication Data

US 2013/0010757 A1    Jan. 10, 2013

Related U.S. Application Data

(63) Continuation of application No. 12/919,034, filed as application No. PCT/US2009/036331 on Mar. 6, 2009, now Pat. No. 8,422,616.

(60) Provisional application No. 61/034,569, filed on Mar. 7, 2008.

(51) Int. Cl.
*H04L 7/00* (2006.01)
*H04W 56/00* (2009.01)
*H04W 36/14* (2009.01)

(52) U.S. Cl.
CPC ........ *H04W 56/0015* (2013.01); *H04W 56/002* (2013.01); *H04W 36/14* (2013.01)
USPC .......................................................... 375/356

(58) Field of Classification Search
None
See application file for complete search history.

(56) References Cited

U.S. PATENT DOCUMENTS

| 8,422,616 B2* | 4/2013 | Jang et al. ...................... 375/356 |
| 2004/0017777 A1 | 1/2004 | Chaudhuri et al. |
| 2007/0149206 A1 | 6/2007 | Wang et al. |
| 2007/0153923 A1 | 7/2007 | Pi et al. |

FOREIGN PATENT DOCUMENTS

| WO | 0239758 A2 | 5/2002 |
| WO | 2009006021 A2 | 5/2002 |

OTHER PUBLICATIONS

Chinese Office Action (Chinese and English versions) dated Oct. 21, 2013 in Chinese Application No. 200980114530.6.
Chinese Office Action dated Jan. 31, 2013 in Chinese Application No. 200980114530.6.

(Continued)

*Primary Examiner* — Leon-Viet Nguyen

(57) ABSTRACT

A wireless access terminal, system and method for the wireless access terminal to synchronize to system times in a wireless communication system. A first timing hierarchy in a first wireless communication network is used to operate the wireless access terminal The lint wireless communication network has a first radio access technology. Operating with the first timing hier-archy includes determining a frame cycle for the first wireless communication network. The frame cycle has a frame cycle boundary. Broadcast parameters for a second wireless communication network having a second radio access technology different from the first radio access technology are received. The broadcast parameters include the system time of the second wireless communication network. The system time of second wireless communication network is aligned, from the perspective of the wireless access terminal, with the frame cycle boundary. The wireless access terminal engages in a communication session using the second wireless communication network.

20 Claims, 3 Drawing Sheets

(56) References Cited

OTHER PUBLICATIONS

Japanese Office Action dated Mar. 8, 2013 in Japanese Application No. 2010-549909.
Nortel, Ericsson, Verizon Wireless, Update of Stage 2 to incorporate interworking with cdma2000; 3GPP TSG-RAN2 Meeting #60; Nov. 9, 2007; R2-075073; pp. 2-17.
Motorola et al.; CDMA System Time Parameter; 3GPP TSG RAN WG2 Meeting #60-bis; Jan. 18, 2008; R2-080588; pp. 2-3.
European Search Report dated Mar. 4, 2014 in European Application No. 09720472.1.
Japanese Office Action dated Jul. 12, 2013 in Japanese Application No. 2010-549909.
Chinese Office Action in Chinese Application No. 200980114530.6 dated Jan. 22, 2014.
Chinese Rejection Decision in Chinese Application No. 200980114530.6 dated Jul. 8, 2014.

* cited by examiner

METHOD AND SYSTEM FOR REDUCED SYSTEM-TIME OVERHEAD PARAMETER LENGTH REPRESENTATION FOR INTER-RADIO ACCESS TECHNOLOGY COMMUNICATION

CROSS REFERENCE TO RELATED APPLICATIONS

This application in a continuation of U.S. patent application Ser. No. 12/919,034, filed Oct. 7, 2010, pending, entitled "METHOD AND SYSTEM FOR REDUCED SYSTEM-TIME OVERHEAD PARAMETER LENGTH REPRESENTATION FOR INTER-RADIO ACCESS TECHNOLOGY COMMUNICATION," which is a U.S. National Stage Patent Application of International Application No. PCT/US2009/036331, filed Mar. 6, 2009, pending, which claims the benefit of U.S. Provisional Patent Application Ser. No. 61/034,569, filed Mar. 7, 2008, all of which are incorporated herein by reference.

FIELD OF THE INVENTION

The present invention relates to wireless communication networks and more specifically to an interworking method and system that allows a wireless access terminal to obtain the system time of a target wireless radio access network while engaged in an active session on a source wires radio access network.

BACKGROUND OF THE INVENTION

Wireless technologies are evolving toward broadband information access across multiple networking platforms to meet demand for continuous availability of multimedia applications. Recent trends indicate that wide-area cellular networks based on second, third and fourth generation ("2G", "3G" and "4G") standards and wireless local area networks ("WLANs") will co-exist to offer multimedia services to end users.

For example, Long-Term Evolution ("LTE") is an effort to develop advanced wireless mobile radio technology that aims to succeed current Third Generation ("3G") telecommunication standards and technology for mobile networking. 3G technologies include but are not limited to Code Division Multiple Access ("CDMA"), Wideband Code Division Multiple Access ("WCDMA"), High Rate Data Packet ("HRPD"), High-Speed Downlink Packet Access ("HSDPA"), and High-Speed Uplink Packet Access ("HSUPA"). The actual LTE standard is known as the International Telecommunication Union ("ITU") 3rd Generation Partnership Project ("3GPP"), Release 8, although the term LTE is often used to reference the standard. LTE is considered by many to be a Fourth Generation ("4G") technology, both because it is faster than 3G technologies, and because, like the Internet, LTE uses an "all-IP" architecture where all information, including voice, is handled as data.

Seamless mobility across the multiple networking platforms (also referred to as "interworking") is therefore needed to enhance interoperability and service continuity among the various wireless networks. Such is the case because it is not practical to simply deploy an entirely new 4G network and instantly turn off the existing older radio access technology network. Further adding to the complexity is that the cost and time needed to deploy a new technology network does not allow for the complete overlay of the new network on top of the old network. The results in coverage "holes" in the new technology network during the deployment process. The result is that, from the perspective of the wireless access terminal, i.e., the mobile device, the wireless access terminal must support both the current, e.g., CDMA, network as well as the new, e.g., LTE network. Support in this sense means not only simply being able to initiate a session with each of these network technologies, but also being able to hand off an active communication session from one network technology to the other without dropping the session. Such is the case where an active session is in progress in the new technology network, but the edge of the LTE network, e.g., the hole, is reached, and the session must be handed off to the 3G, e.g., CDMA, network.

Among the factors to be considered to support active session handoff (also referred to as "active mode handover") is network timing. For example, the system time of the target radio access technology, e.g., the CDMA network, has to be known by the access terminal prior to the active mode handoff, e.g., while the wireless access terminal is still camped onto the source radio access technology, e.g., the LTE network In such case, there needs to be enough timing resolution so that the access terminal can accurately acquire the target radio access technology's system timing during the handover. One solution that has been proposed is to have the target radio access technology (3G) network periodically, i.e., asynchronously, broadcast a message on a common channel for receipt by the access terminal. For the case of LTE to CDMA handover, a 49-bit SYSTEM_TIME field has been proposed for use as part of the overhead parameters transmitted on the common channel. While the use of a 49-bit field to carry the system time provides enough resolution to allow the access terminal to find the actual CDMA system time, the size of the field results in inefficient operation because it consumes a huge amount of overhead channel resources.

Therefore, what is needed is a system and method that allows an access terminal to obtain the system time of the target radio access technology network in a manner that minimizes overhead consumption.

SUMMARY OF THE INVENTION

The present invention advantageously provides a method and system that allows a wireless access terminal to synchronously obtain the system time of the target radio access technology network. Doing so in this manner minimizes overhead consumption when compared with asynchronous methods and systems for doing the same.

One aspect of the present invention provides a method for a wireless access terminal to synchronize to system times in a wireless communication system. A first timing hierarchy in a first wireless communication network is used to operate the wireless access terminal. The first wireless communication network has a first radio access technology. Operating with the first timing hierarchy includes determining a frame cycle for the first wireless communication network. The frame cycle has a frame cycle boundary. Broadcast parameters for a second wireless communication network having a second radio access technology different from the first radio access technology are received. The broadcast parameters include the system time of the second wireless communication network. The system time of second wireless communication network is aligned, from the perspective of the wireless access terminal, with the frame cycle boundary. The wireless access terminal engages in a communication session using the second wireless communication network.

In accordance with another aspect, the present invention provides a wireless access terminal. The wireless access terminal has a receiver and a central processing unit in electrical communication with the receiver. The central processing unit operates to use a first timing hierarchy in a first wireless communication network. The first wireless communication network has a first radio access technology. Using the first timing hierarchy includes determining a frame cycle for the first wireless communication network in which the frame cycle has a frame cycle boundary. The central processing unit also operates to receive broadcast parameters for a second wireless communication network via the receiver. The second wireless communication network has a second radio access technology different from the first radio access technology. The broadcast parameters include a system time of the second wireless communication network. The central processing unit further operates to align, from the perspective of the wireless access terminal, the system time of second wireless communication network with the frame cycle boundary, and engages in a communication session using the second wireless communication network.

In accordance with yet another aspect, the present invention provides a system for wireless communication. The system has a wireless access terminal A first wireless communication network is in communication with the wireless access terminal The first wireless communication network has a first radio access technology using a first timing hierarchy. The first timing hierarchy has a frame cycle with a frame cycle boundary. A second wireless communication network is in communication with the wireless access terminal in which the second wireless communication network has a second radio access technology different from the first radio access technology. The first wireless communication network transmits broadcast parameters to the wireless access terminal in which the broadcast parameters include a system time of the second wireless communication network. The wireless access terminal aligns the system time of second wireless communication network with the frame cycle boundary and engages in communication session using the second wireless communication network.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
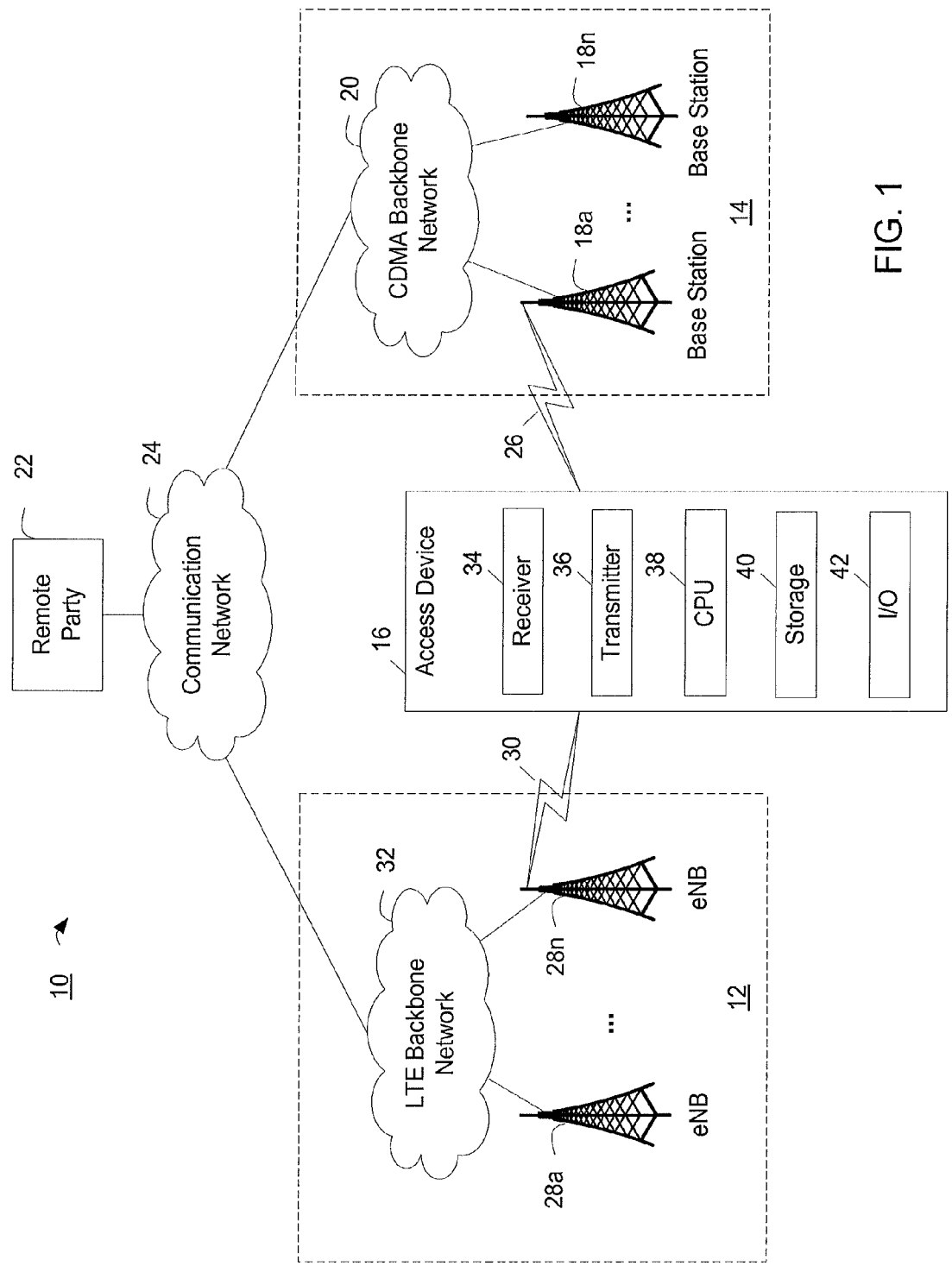
FIG. 1 is a block diagram of a system constructed in accordance with the principles of the present invention.

Before describing in detail exemplary embodiments that are in accordance with the present invention, it is noted Long-term evolution ("LTE") is part of the third generation partnership project ("3GPP") and is directed to improving the universal mobile telecommunications system ("UMTS") mobile telephone standard by providing a simplified, all-packet architecture. UMTS technology supports mobile internet protocol ("IP") services, such as music downloads, video sharing, voice over IP broadband access, and other IP services to laptops, personal digital assistants ("PDAs") and other mobile terminals. LTE enhances current UMTS capabilities by providing improved efficiency, lower costs, increased peak data rates, lower latency, improved services and improved integration with other open standards.

Also, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Now referring to the drawing figures in which like reference designators refer to like elements, there is shown in FIG. 1 a system constructed in accordance with the principles of the present invention and designated generally as "10". System 10 includes first radio access network 12, e.g., an LTE network, second radio access network 14, e.g., a CDMA network, and wireless access terminal 16 in wireless communication with first radio access network 12 and second radio access network 14. Of note, although the present invention is described with respect to LTE/CDMA and LTE/HRPD interworking, it is understood that the principles of the present invention are readily implementable for other wireless interworking environments where the synchronization with the target system time is desirable to facilitate active mode handover. For example, it should be appreciated that, although the invention is described with reference to the LTE network 12 and the CDMA network 14, the principles of the invention may be adapted by one of skill in the art to migrate between any networks, including other UMTS networks, WiMAX (802.16) networks, other CDMA2000 networks and any other networks known in the art or later developed.

According to one embodiment, the invention is directed obtaining the system time of the source, e.g., CDMA, network when moving wireless access terminals 16 from the LTE network 12 to the CDMA network 14. Such may be the case when the source LTE network 12 determines that the wireless access terminals 16 will be better served in the CDMA network 16, such as prior to the wireless access terminals 16 falling off the LTE network 12.

CDMA network 14 includes base stations 18a-18n (referred to collectively herein as "base stations 18") in communication with CDMA backbone network 20. Although not shown, it is understood that CDMA backbone network 20 includes devices to facilitate intra-CDMA network 14 communications, e.g., Radio Network Controllers, as well as those devices used to allow communication from CDMA network 14 to remote party 22 via communications network 24. It is understood that details regarding communication from CDMA network 14 to remote party 22 are outside the scope of the present invention and, hence, are not discussed herein.

Base stations 18 may include transceivers that transmit and receive radio signals, antennas, and equipment for encrypting and decrypting communications (not shown). Base stations 18 may include hardware and software that implement the functions described herein to support synchronous mode system time acquisition (not shown). For example, base stations 18 may include a central processing unit ("CPU"), transmitter, receiver, and I/O devices and storage, such as volatile and nonvolatile memory, to implement the functions described herein. Base stations 18 communicate with the mobile access terminal 16 over a radio communication link 26. As discussed below in detail, among other things, radio communication link 26 carries CDMA system time information to mobile access terminal 16.

According to one embodiment of the invention, LTE network 12 may include evolved Node-Bs 28a-28n (referred to collectively herein as "eNB 28") that include a server, transceivers for transmitting and receiving radio signals, and antennas. An eNB 28 may include two-way transceivers that broadcast data into the surrounding environment and typically act as mediators between wired and wireless networks. include transceivers that transmit and receive radio signals, antennas, and equipment for encrypting and decrypting communications (not shown). An eNB 28 may include hardware and software that implement the functions described herein to support synchronous mode system time acquisition. For example, base stations 18 may include a central processing unit ("CPU"), transmitter, receiver, and I/O devices and storage, such as volatile and nonvolatile memory, to implement the functions described herein. The eNBs 28 communicate with the mobile access terminal 16 over an LTE radio communication link 30.

An eNB 28 typically performs several functions, including radio resource management, such as radio bearer control, radio admission control, connection mobility control, dynamic allocation of resources, e.g., scheduling, to wireless access terminals 16 in both uplink and downlink; IP header compression and encryption of user data streams, selection and use of an MME (not shown) when the mobile access terminal 14 is attached. LTE backbone network 32 may provide communications between eNB 28 and the MME as well as with remote party 22 via communication network 24. Communication network 24 can be, for example, a transmission control protocol/internet protocol based network such as the Internet.

According to one embodiment, the wireless access terminals 16 can be arranged as any of a wide range of portable electronic devices, including but not limited to mobile phones, personal data assistants ("PDA") and similar devices, which use the various communication technologies described herein such as advanced mobile phone system ("AMPS"), time division multiple access ("TDMA"), code division multiple access ("CDMA"), global system for mobile communications ("GSM"), general packet radio service ("GPRS"), 1x evolution-data optimized (abbreviated as "EV-DO" or "1xEV-DO"), LTE and universal mobile telecommunications system ("UMTS").

Wireless access terminals 16 also include the hardware and software suitable to support the functions needed to engage in wireless communication with eNB 28 and base stations 18. Such functions include operating to synchronously obtain the system time of CDMA network 14. Wireless access hardware terminal 16 hardware can include a receiver 34, transmitter 36, central processing unit ("CPU") 38, storage 40 in the form of volatile and nonvolatile memory, and input/output devices 42, among other hardware. These hardware elements can electrically communicate with one another, as needed, within wireless access terminal 16. Storage device 40 stores the programmatic code, which when executed by central processing unit 38, performs the functions of the present invention described herein. Of note although wireless access terminal 16 is described herein as using a CPU to implement the functions of the present invention, it is understood that such description is made solely for ease of explanation. It is contemplated that other devices, such as digital signal processors, programmable arrays, etc. may be used in conjunction with or instead of a traditional CPU.

According to one embodiment of the invention, the LTE network 12 is the primary network for connecting the wireless access terminals 16 to one or more remote parties 22. However, when the LTE network 12 is unavailable, unreliable and/or provides inferior QoS, or whenever the eNB 28 determines that an inter-technology handoff needs to be triggered, then the wireless access terminals 16 may be moved to the secondary CDMA network 14. In such case, the wireless access terminal synchronously obtains the system time for CDMA network 14.

Figure 2:
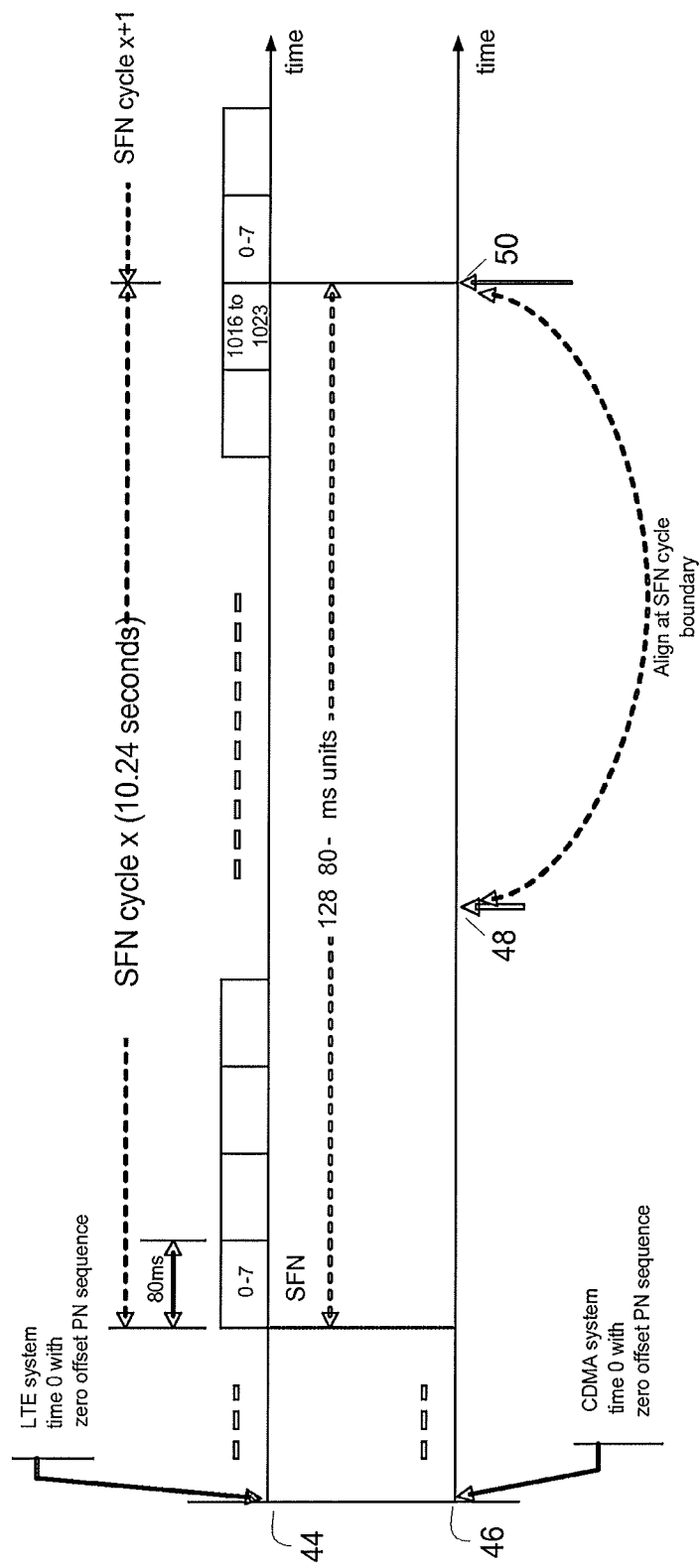
FIG. 2 is a timing diagram showing an example of synchronous system timing between an LTE wireless communication network and a CDMA wireless communication network with a zero offset pseudo-noise sequence from the perspective of a wireless access terminal in accordance with the present invention.

An example of synchronous mode operation for wireless access terminal 16 is described with reference to FIG. 2. FIG. 2 is a diagram showing an example of synchronous system timing between LTE wireless communication network 12 and CDMA wireless communication network 14 with a zero offset pseudo-noise sequence for the pilot channel. The timing diagram shown in FIG. 2 includes LTE timing hierarchy 44 and CDMA timing hierarchy 46. LTE timing hierarchy 44 shows a 10.24 second system frame number ("SFN") cycle. An SFN cycle includes 1024 SFNs arranged in groups of eight SFNs such that each group of eight SFNs occupies 80ms. In other words, each SFN (LTE packet) is a 10ms time period.

CDMA timing hierarchy 46 shows a timing hierarchy for a CDMA system with a 0 offset pseudonoise ("PN") sequence. It is understood that for a CDMA system, the system time field is a 36-bit field using an 80ms super frame. In operation, using active handover as an example, wireless access device 16 receives broadcast parameters from eNB 28 in LTE network 12 on an overhead, i.e. pilot, channel. The broadcast parameters include a system time for CDMA network 14. Assume in this example that the broadcast parameters for CDMA network 14 are received at time 48. As is shown in FIG. 2, time 48 occurs somewhere within the SFN cycle, but not at an SFN cycle boundary, i.e. between LTE packet 1023 and LTE packet 0 of the next SFN cycle. In accordance with the present invention, wireless access terminal 16 operates to align the system time of the CDMA network 14 with a frame cycle boundary, shown in FIG. 2 as alignment occurring at alignment point 50. By creating a reference point, less resolution is needed to synchronize with the CDMA network 14 system time because timing is already being tracked for LTE network 12.

It has been found that by aligning the system time of the target wireless communication network with the frame cycle boundary of the source wireless communication network a reduction in the length of the system time field can be achieved. For example, it has been found that the system time field in an LTE network can be reduced to 29 bits while still allowing synchronization with the system time of the CDMA network. Once the system times are aligned and wireless access device 16 can synchronize with CDMA network 14, a communication session with CDMA network 14 can be established, thereby facilitating active mode handover from the LTE network 12 to the CDMA network 14.

It must be noted that, although FIG. 2 is described with reference to a zero offset PN sequence, the present invention is readily implementable in environments that do use a PN sequence offset. In other words, implementation of the present invention does not have an impact on PN sequence offset considerations. As such, wireless access terminal 16 can align with the CDMA hierarchy sector based on the PN sequence offset of that sector. An example of such an implementation is described with reference to FIG. 3.

Figure 3:
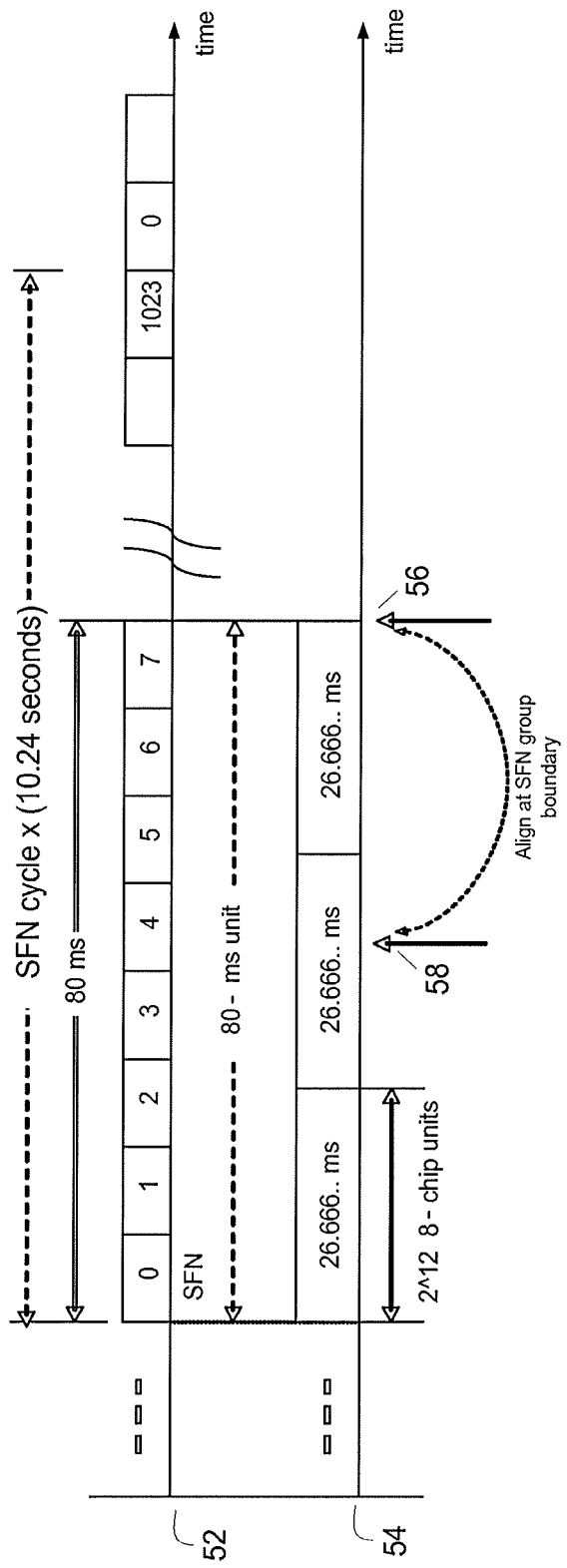
FIG. 3 is a timing diagram showing synchronous system timing between an LTE wireless communication network and an HRPD wireless communication network from the perspective of a wireless access terminal in accordance with the present invention.

FIG. 3 is a timing diagram showing synchronous system timing between an LTE wireless communication network and a high rate packet data ("HRPD") wireless communication network from the perspective of wireless access terminal 16. FIG. 3 includes LTE timing hierarchy 52 and HRPD timing hierarchy 54. Of note, LTE timing hierarchy 52 in FIG. 3 is the same as the LTE timing hierarchy 44 shown in FIG. 2. For ease of explanation, LTE timing hierarchy 52 is arranged to highlight the 80ms 8 SFN grouping. In other words, while LTE timing hierarchy 44 in FIG. 2 shows 128 80 ms units, LTE timing hierarchy 52 in FIG. 3 zooms in to show a single 80ms unit.

As is shown in FIG. 3, it is not necessary to wait for the 10.24 second SFN cycle boundary to synchronize to the target, e.g. HRPD, system time. Rather, the boundary of an 80ms LTE grouping can be used, as shown by the boundary at time point 56. As such, because the HRPD system time is arranged to align at the boundary of an 80ms LTE unit based on a zero offset PN sequence, the wireless access terminal 16 can align with the HRPD (or CDMA) sector based on the PN sequence offset of that particular sector.

As shown in FIG. 3, HRPD timing hierarchy 54 is arranged such that an 80ms unit within hierarchy 54 can coincide with the 8 SFN group boundary, also 80ms. For example, although $2^{12}$ 8—chip units in hierarchy 54 equates to 26.666ms which does not align with an SFN boundary in LTE hierarchy 52, e.g., the HRPD system time is received at time point 58. However, three 26.66ms units do equate to 80ms such that aligning the system time of the HRPD network (from the perspective of wireless access terminal 16) aligns with the 8 SFN group boundary at time point 56.

Of note, although FIG. 3 is described with respect to an HRPD time hierarchy, the invention is equally applicable to CDMA, e.g., 1xRTT, hierarchy as both technologies share the same frame width. Also, although the present invention is described in FIG. 3 with respect to $2^{12}$ 8—chip units, the number of chips in a unit can be adjusted depending on the desired timing resolution. For example, using a $2^{11}$ 8—chip unit, a 13.33 ms unit would result. Therefore, the duration to aligning with an SFN 8 group boundary may require a delay of additional HRPD units as compared with that shown in FIG. 3.

Any kind of computing system, or other apparatus adapted for carrying out the methods described herein, is suited to perform the functions described herein. A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for a wireless access terminal to synchronize to system times in a wireless communication system, the method comprising:
   using a first timing hierarchy in a first wireless communication network to operate the wireless access terminal, the first wireless communication network having a first radio access technology, operating with the first timing hierarchy including determining a frame cycle for the first wireless communication network, the frame cycle having a frame cycle boundary;
   receiving broadcast parameters, within a system frame number ("SFN") cycle, for a second wireless communication network having a second radio access technology different from the first radio access technology, the broadcast parameters including a system time of the second wireless communication network;
   aligning, from the perspective of the wireless access terminal, the system time of the second wireless communication network with the frame cycle boundary, wherein the frame cycle boundary is a beginning of a next SFN cycle; and
   engaging in a communication session using the second wireless communication network.

2. The method according to claim 1, wherein the first radio access technology is LTE.

3. The method according to claim 2, wherein the first timing hierarchy of the LTE network includes a system frame number ("SFN") cycle, wherein the frame cycle boundary is the beginning of an SFN cycle.

4. The method according to claim 2, wherein the first timing hierarchy of the LTE network includes a system frame number ("SFN") cycle, the SFN cycle having a plurality of system frames, wherein the frame cycle boundary is the beginning of a system frame.

5. The method according to claim 2, wherein the first timing hierarchy of the LTE network includes a system frame number ("SFN") cycle, the SFN cycle having a plurality of system frames, wherein the system frames are arranged into groups of eight system frames, the frame cycle boundary being the beginning of an eight system frame group.

6. The method according to claim 1, wherein the second radio access technology is high rate packet data ("HRPD").

7. The method according to claim 6, wherein a timing hierarchy of the HRPD network includes a plurality of frames, each of the plurality of frames arranged using a predetermined quantity of chip units.

8. The method according to claim 7, wherein a boundary of a group of the plurality of frames coincides with a beginning of an eight system frame group.

9. The method according to claim 1, wherein the first radio access technology uses a pilot channel.

10. The method according to claim 1, wherein the second radio access technology is CDMA.

11. The method according to claim 1, further comprising handing off an active communication session from the first wireless communication network to the second wireless communication network.

12. A wireless access terminal, the wireless access terminal comprising:
   a receiver; and
   a processor configured to:
      use a first timing hierarchy in a first wireless communication network, the first wireless communication network having a first radio access technology, using the first timing hierarchy including determining a frame cycle for the first wireless communication network, the frame cycle having a frame cycle boundary;
      receive broadcast parameters, within a system frame number ("SFN") cycle, for a second wireless communication network via the receiver, the second wireless communication network having a second radio access technology different from the first radio access technology, the broadcast parameters including a system time of the second wireless communication network;
      align, from the perspective of the wireless access terminal, the system time of the second wireless communication network with the frame cycle boundary, wherein the frame cycle boundary is a beginning of a next SFN cycle; and
      engage in a communication session using the second wireless communication network.

13. The wireless access terminal according to claim 12, wherein the first radio access technology is LTE.

14. The wireless access terminal according to claim 13, wherein the first timing hierarchy of the LTE network includes a system frame number ("SFN") cycle, wherein the frame cycle boundary is the beginning of an SFN cycle.

15. The wireless access terminal according to claim 13, wherein the first timing hierarchy of the LTE network includes a system frame number ("SFN") cycle, the SFN cycle having a plurality of system frames, wherein the frame cycle boundary is the beginning of a system frame.

16. The wireless access terminal according to claim 12, wherein the second radio access technology is high rate packet data ("HRPD").

17. The wireless access terminal according to claim 16, wherein a timing hierarchy of the HRPD network includes a plurality of frames, each of the plurality of frames arranged using a predetermined quantity of chip units.

18. The wireless access terminal according to claim 12, wherein the first radio access technology uses a pilot channel.

19. The wireless access terminal according to claim 12, wherein the processor is further configured to hand off an active communication session from the first wireless communication network to the second wireless communication network.

20. A wireless communication system comprising:
   a wireless access terminal;
   a first wireless communication network in communication with the wireless access terminal, the first wireless communication network having a first radio access technology using a first timing hierarchy, the first timing hierarchy having a frame cycle with a frame cycle boundary;
   a second wireless communication network in communication with the wireless access terminal, the second wireless communication network having a second radio access technology different from the first radio access technology;
   the first wireless communication network transmitting broadcast parameters, within a system frame number ("SFN") cycle, to the wireless access terminal, the broadcast parameters including a system time of the second wireless communication network; and
   the wireless access terminal aligning the system time of the second wireless communication network with the frame cycle boundary and engaging in communication session using the second wireless communication network, wherein the frame cycle boundary is a beginning of a next SFN cycle.

* * * * *